United States Patent [19]
Iwasaki

[11] Patent Number: 5,287,239
[45] Date of Patent: Feb. 15, 1994

[54] MAGNETIC HEAD USING HIGH SATURATED MAGNETIC FLUX DENSITY FILM AND MANUFACTURING METHOD THEREOF

[75] Inventor: Hitoshi Iwasaki, Yokohama, Japan

[73] Assignee: Kabushiki Kaisha Toshiba, Kawasaki, Japan

[21] Appl. No.: 547,028

[22] Filed: Jul. 2, 1990

[30] Foreign Application Priority Data

Jul. 5, 1989 [JP] Japan .................. 1-171967
Nov. 1, 1989 [JP] Japan .................. 1-282924

[51] Int. Cl.⁵ .................. G11B 5/147; B32B 9/00
[52] U.S. Cl. .................. 360/126; 360/125; 428/692
[58] Field of Search ........... 360/110, 103, 119–126; 428/678, 694, 692, 900; 75/246

[56] References Cited

U.S. PATENT DOCUMENTS

| | | | |
|---|---|---|---|
| 3,562,444 | 2/1971 | Hoogerdouin | 360/103 |
| 3,823,416 | 7/1974 | Warner | 360/103 |
| 4,245,008 | 1/1981 | Michaelson et al. | 428/678 |
| 4,690,744 | 9/1987 | Naoe et al. | 427/39 |
| 4,772,976 | 9/1988 | Otomo et al. | 360/125 |
| 4,780,781 | 10/1988 | Sano et al. | 360/126 |
| 4,809,103 | 2/1989 | Lazzari | 360/126 |
| 4,833,044 | 5/1989 | Takahashi et al. | 428/900 |
| 4,925,502 | 5/1990 | Yanagishi et al. | 75/246 |
| 4,935,311 | 6/1990 | Nakatari et al. | 428/611 |
| 5,008,767 | 4/1991 | Iwata et al. | 360/126 |
| 5,021,909 | 6/1991 | Shiiba | 360/110 |
| 5,023,148 | 6/1991 | Fisher et al. | 428/694 |
| 5,024,854 | 6/1991 | Nakamura et al. | 427/38 |
| 5,051,856 | 9/1991 | Narishige et al. | 360/126 |
| 5,057,380 | 10/1991 | Hayashi et al. | 428/692 |
| 5,063,120 | 11/1991 | Edmonson et al. | 428/694 |
| 5,072,322 | 12/1991 | Yasai et al. | 360/103 |
| 5,091,266 | 2/1992 | Omata | 428/692 |
| 5,114,800 | 5/1992 | Shimizu et al. | 428/692 |
| 5,134,818 | 8/1992 | Shimada et al. | 428/692 |

FOREIGN PATENT DOCUMENTS

| | | |
|---|---|---|
| 3833901 | 4/1989 | Fed. Rep. of Germany . |
| 56-163518 | 12/1981 | Japan . |
| 58-14311 | 1/1983 | Japan . |
| 61-199219 | 9/1986 | Japan . |
| 62-18968 | 4/1987 | Japan . |

OTHER PUBLICATIONS

IEEE Trans. Magn., MAG-23, No. 5, Sep. 1987, "High Moment CoFe Thin Films by Electrodeposition" Simon H. Liao (pp. 2981–2983).
J. Appl. Phys., vol. 43, No. 8, Aug. 1972, "Magnetic Properties of Sputtered Ni-Fe and Fe-Co Alloy Lasers" H. R. Philipp and J. J. Tiemann (pp. 3542–3545).
J. Mag. Soc. Japan, 13, No. 2, 1989 "Magnetic Properties and Crystal Structures of Sputtered CoFe Films" H. Iwasaki (pp. 315–318).

Primary Examiner—Stuart S. Levy
Assistant Examiner—Jefferson Evans
Attorney, Agent, or Firm—Oblon, Spivak, McClelland, Maier & Neustadt

[57] ABSTRACT

A magnetic head including a magnetic film formed on a substrate. The magnetic film contains a Co-rich Fe alloy having a face-centered cubic phase in which the <100> axis has been oriented in a direction perpendicular to the film surface, an insulating film formed on the magnetic film, and coils buried in the insulating film so as to generate a magnetic field. The Co-rich Fe alloy contains 15 to 24 atomic % of Fe. The magnetic head is manufactured by forming a magnetic film on a substrate, the magnetic film containing a Co-rich Fe alloy having a fcc phase in which the <100> axis has been oriented in a direction perpendicular to the film surface. Next, an insulating film having coils for generating a magnetic field buried therein is formed on the magnetic film.

12 Claims, 9 Drawing Sheets

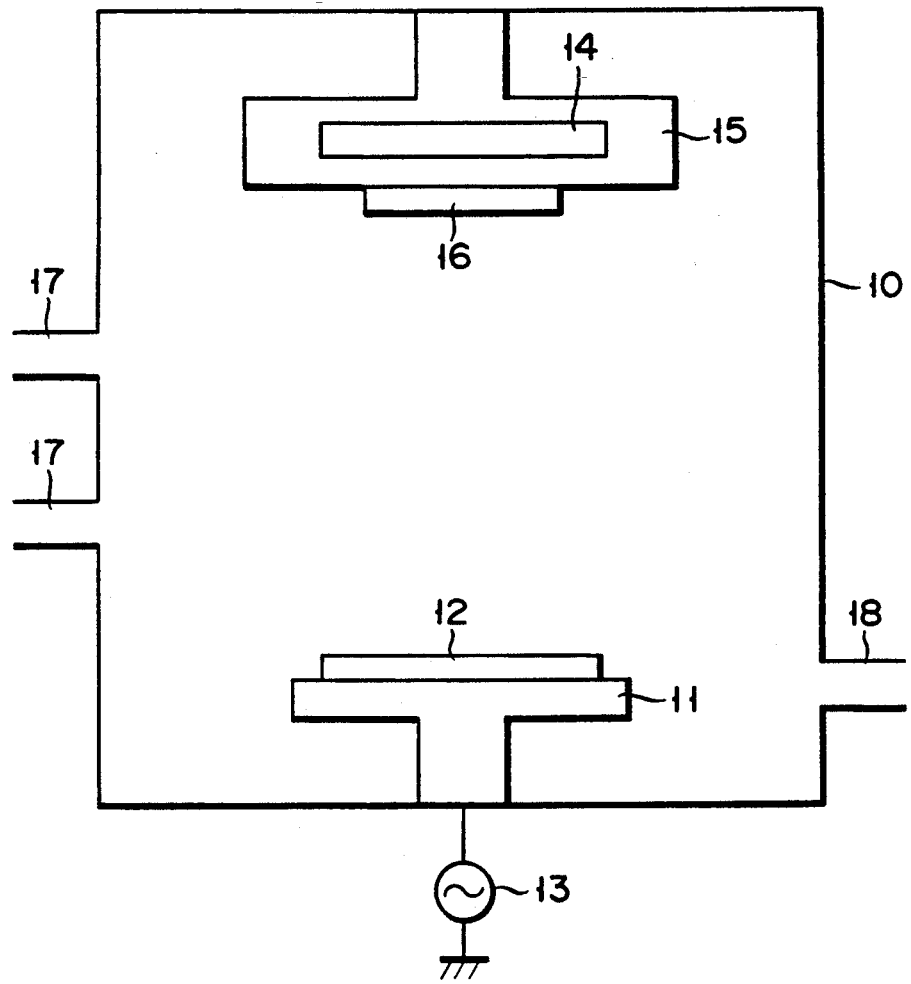
F I G. 1

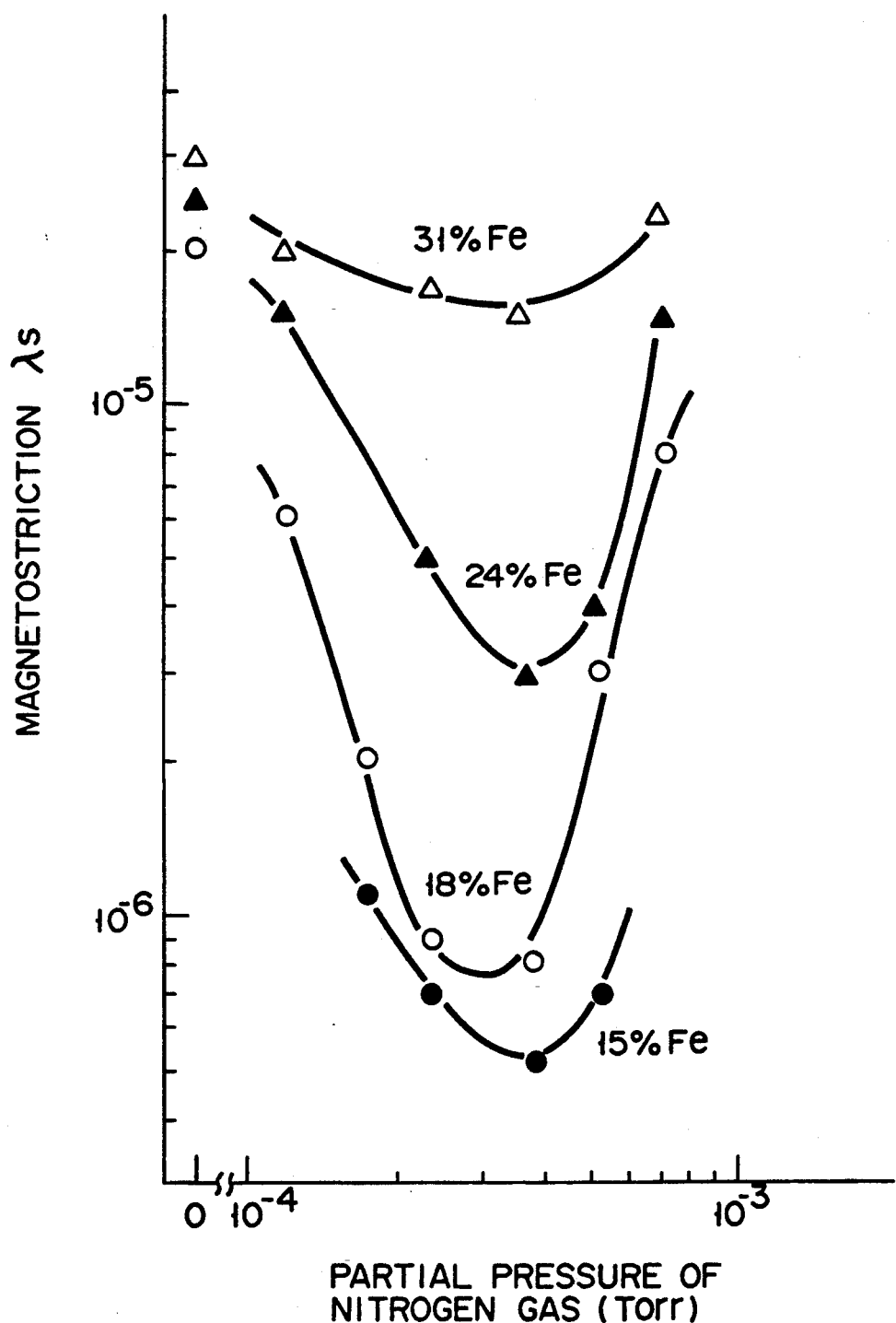
F I G. 3

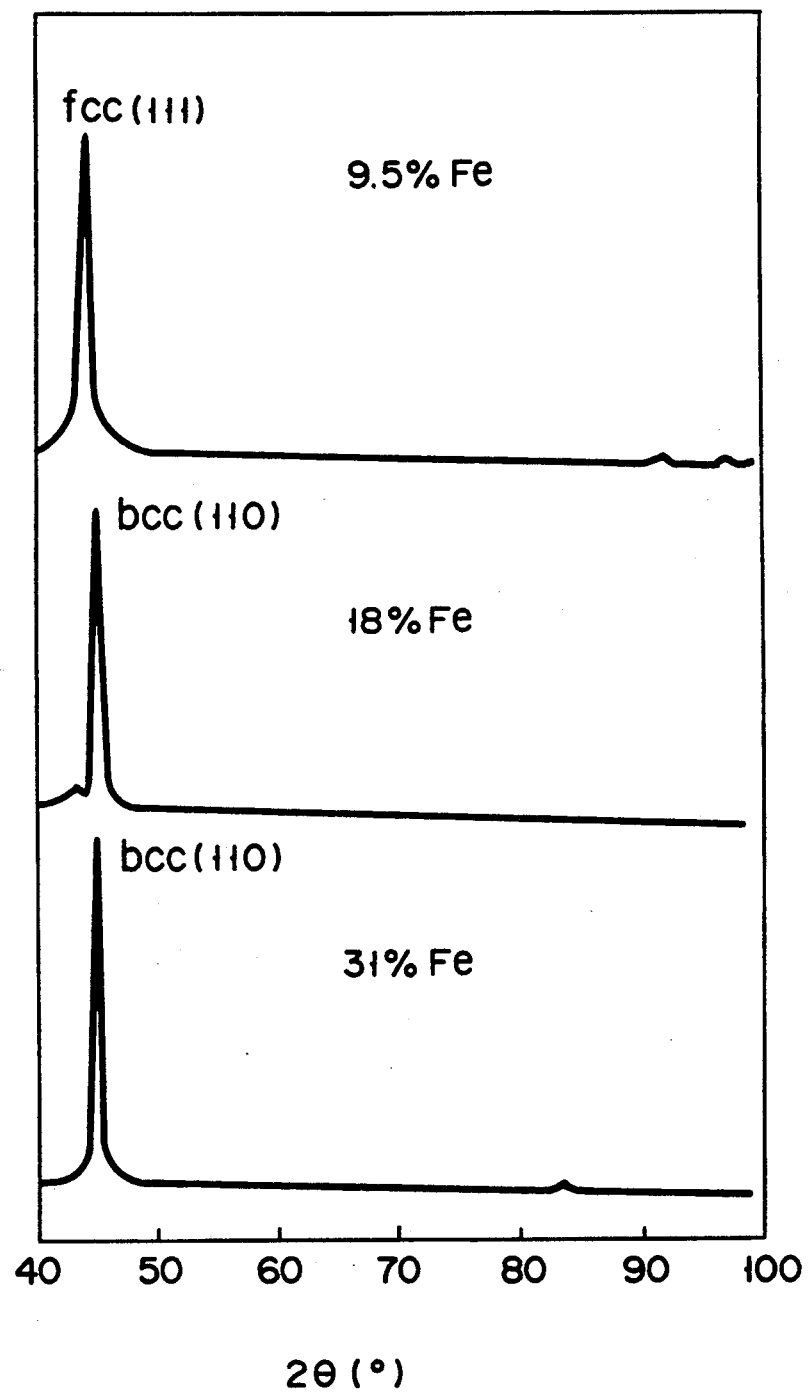
F I G. 4

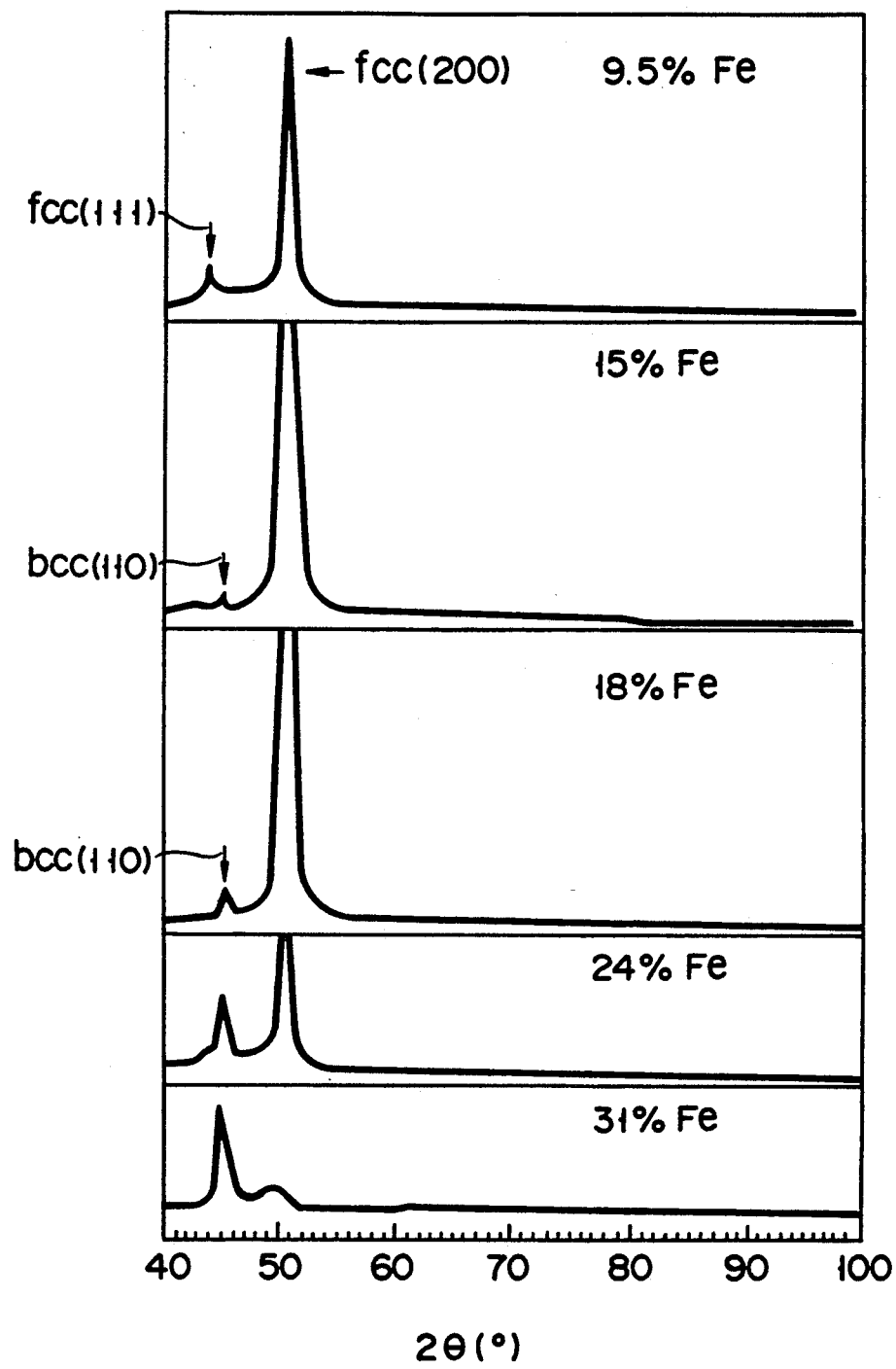
F I G. 5

MAGNETIC HEAD USING HIGH SATURATED MAGNETIC FLUX DENSITY FILM AND MANUFACTURING METHOD THEREOF

BACKGROUND OF THE INVENTION

1. Field of the Invention

The present invention relates to a magnetic head having a high saturation magnetic flux density, a low coercive force and a low magnetostriction as well as to a method of manufacturing the same.

2. Description of the Related Art

Recently, vigorous research is being performed in an attempt to develop an Fe series film having a saturation magnetic flux density Bs as high as 20 kG. It is known to the art that a Co-rich Fe alloy film is fully comparable with the Fe series film in the value of Bs. Also, the Co-rich Fe alloy film is superior to the Fe series film in its corrosion resistance. Incidentally, the Co-rich Fe alloy usually represents an Fe—Co alloy containing 10 to 40 atm% of Fe with the balance being substantially Co, optionally containing impurity elements. On the other hand, the Fe series film contains at least 85% of Fe together with other impurity elements.

It is necessary for a magnetic film included in a magnetic head to exhibit a low coercive force Hc and a low magnetostriction $\lambda s$ as well as a high saturation magnetic flux density Bs.

It is reported in "IEEE Trans. Magn., MAG-23 (1987) 2981" that a Co-10%Fe alloy film prepared by plating exhibits a small value of Hc and a small value of $\lambda s$, which are fully comparable with those exhibited by an Fe series film.

In the manufacture of various thin films used in a magnetic head, it is desirable to employ a dry process such as sputtering or vapor deposition in place of a wet process, as in the field of semiconductor devices. It should also be noted that, in the case of performing the recording/reproducing operation at a high transfer rate, it is desirable to employ a magnetic film of a multilayer structure including an interposing intermediate insulating layer formed of, for example, silicon dioxide in order to suppress the eddy current generation. It is difficult to manufacture such a magnetic film of a multilayer structure by means of a wet process such as plating.

Under the circumstances, it is desirable to manufacture a Co-rich Fe alloy film exhibiting still smaller values of Hc and $\lambda s$ by means of a dry process such as sputtering or vapor deposition. The present inventors have performed vigorous research along this line in an attempt to manufacture a Co-rich Fe alloy film by means of sputtering. It is reported in "J. Appl. Phys., 43 (1972) 3542" that a Co-rich Fe alloy film prepared by sputtering fails to exhibit a low coercive force Hc. However, the present inventors have clarified that a Co-rich Fe alloy film containing about 18% of Fe prepared by sputtering exhibits a small value of Hc, which is fully comparable with that of an alloy film prepared by plating, as reported in "Collection of Lecture Articles in 12th Meeting of Japan Applied Magnetism Institute". However, the Co-18%Fe alloy film prepared by means of sputtering exhibits such a large magnetostriction $\lambda s$ as $1 \times 10^{-5}$ or more. In order to actually use the alloy film in a magnetic head, it is clearly necessary to further lower the value of $\lambda s$ while maintaining the low value of coercive force Hc.

To reiterate, the Co-rich Fe alloy film prepared nowadays by means of sputtering exhibits such a high saturation magnetic flux density as about 20 kG, but is unsatisfactory in the values of Hc and $\lambda s$, making it undesirable to use the alloy film as a magnetic film included in a magnetic head. Naturally, a conventional magnetic head including a Co-rich Fe alloy film prepared by a dry process is incapable of achieving the information recording at a high density.

SUMMARY OF THE INVENTION

It is an object of the present invention to provide a magnetic head capable of achieving the information recording at a high density, by having a magnetic film formed of a Co-rich Fe alloy exhibiting a high saturation magnetic flux density, a low coercive force and a low magnetostriction.

It is another object of the invention to provide a method of manufacturing a magnetic head capable of achieving the information recording at a high density.

The above and other related objects of the invention are achieved by a magnetic head comprising a substrate, a specified magnetic film formed on the substrate, an insulating film formed on the magnetic film, and coils buried in the insulating film for generating a magnetic field. It is important to note that the magnetic film comprises a Co-rich Fe alloy alley including fcc phase, in which the <100> axis is oriented in a direction perpendicular to the film surface, in the largest amount, among other phases.

The magnetic film used in the magnetic head of the present invention may be formed by deposition of a Co-rich Fe alloy containing 15 to 24 atomic % of Fe by means of sputtering under an argon, xenon or krypton gas atmosphere containing an incorporating gas of nitrogen, oxygen or neon. The incorporating gas is contained in the atmosphere in such an amount that the deposited alloy film contains not more than 2 atomic % of nitrogen.

Additional objects and advantages of the invention will be set forth in the description which follows, and in part will be obvious from the description, or may be learned by practice of the invention. The objects and advantages of the invention may be realized and obtained by mean of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 schematically shows a sputtering apparatus used for the manufacture of a magnetic head of the present invention;

FIG. 3 is a graph showing the relationship between a magnetostriction $\lambda s$ and a nitrogen gas partial pressure, with an Fe concentration used as a parameter;

FIG. 4 is a graph showing the dependence of the X-ray diffraction curve on the Fe concentration in the case of using a pure argon gas;

FIG. 5 is a graph showing the dependence of the X-ray diffraction curve on the Fe concentration in the case where the magnetic film is manufactured under a nitrogen gas partial pressure of $3.8 \times 10^{-4}$ Torr.

DETAILED DESCRIPTION OF THE PREFERRED EMBODIMENTS

Figure 2:
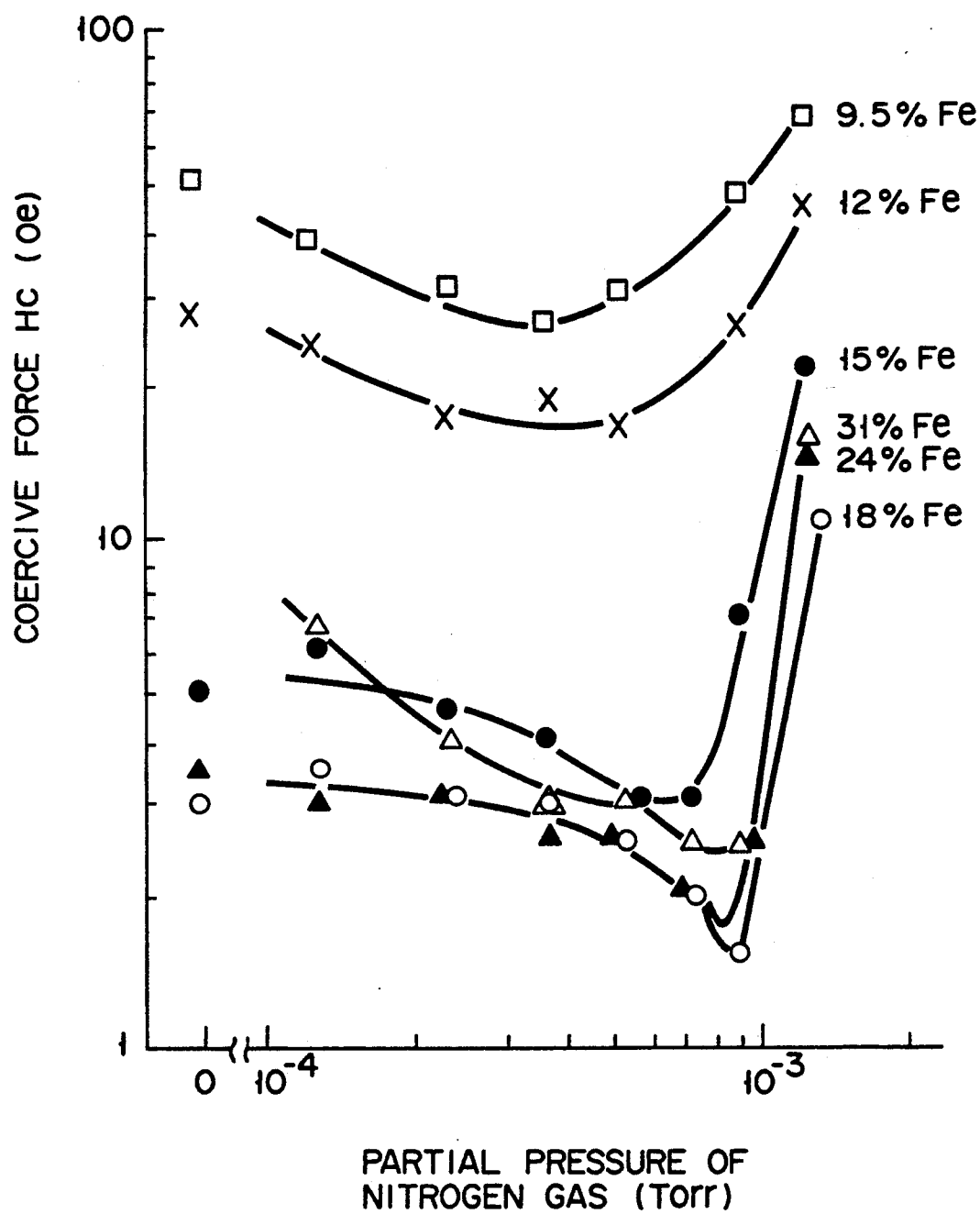
FIG. 2 is a graph showing the relationship between a coercive force Hc and a nitrogen gas partial pressure, with an Fe concentration used as a parameter.

In order to clarify the characteristics of a magnetic film used in a magnetic head of the present invention, a magnetic film was formed on a glass substrate using a sputtering apparatus shown in FIG. 1, and the resulting film was evaluated. As seen from the drawing, the sputtering apparatus comprises a reaction vessel 10. A target support member 11 having a target 12 mounted thereon is disposed in the bottom portion of the reaction vessel 10. Used in this experiment was a composite target prepared by arranging a plurality of Fe chips on a disk formed of Co. A high frequency power source 13 is connected to the target support member 11.

A substrate support member 15 having a permanent magnet 14 arranged along the outer periphery thereof is mounted at the top portion of the reaction vessel 10. The permanent magnet 14 serves to apply in one direction an external magnetic field across the thickness of, or perpendicular to the surface of, a magnetic film so as to impart a uniaxial magnetic anisotropy to the magnetic film. It is possible to dispose the permanent magnet 14 at any desired position as far as an external magnetic field is applied in one direction across the thickness of the magnetic film. For example, it is possible to bury the permanent magnet 14 within the substrate support member 15. A substrate 16 is mounted to the substrate support member 15. Used in this experiment as the substrate 16 was a glass substrate (0211 substrate manufactured by Corning Inc. USA).

Two gas inlet ports 17 are formed in the side wall of the reaction vessel 10. A nitrogen gas and an argon gas are introduced into the reaction vessel through these two gas inlet ports 17, respectively. Further, a gas exhaust port 18 is formed in that portion of the side wall of the reaction vessel 10 which is opposite to the portion where the gas inlet ports are formed. The reaction vessel 10 is evacuated through the gas exhaust port so as to provide a vacuum within the reaction vessel 10.

Using the apparatus of the construction described above, sputtering was carried out under a mixed gas atmosphere consisting of a nitrogen gas and an argon gas so as to form Co-rich Fe alloy films having a thickness of 0.3 micron on glass substrates. The sputtering conditions were as follows:

High frequency power density 5 W/cm
Sputtering gas total pressure: $9 \times 10^{-3}$ Torr
Nitrogen gas partial pressure: 0 to $1.35 \times 10^{-3}$ Torr
Distance between two electrodes: 40 mm
Preliminary gas exhaust: $1 \times 10^{-6}$ Torr or less
Fe concentration in the sputtering target Co: 9.5 to 31 atomic %

The coercive force Hc of the magnetic films thus prepared was measured by applying a magnetic field of 250 Oe max. In a direction of the difficult axis. FIG. 2 shows the relationship between a coercive force Hc and a nitrogen gas partial pressure, with an Fe concentration used as a parameter. As seen from FIG. 2, the films containing 15 to 24 atomic % of Fe, which were prepared by means of sputtering under a pure argon gas atmosphere (nitrogen gas partial pressure being 0) exhibited a low coercive force Hc as 5 Oe or less. On the other hand, the films containing less than 15 atomic % or more than 24 atomic % of Fe exhibited a relatively high coercive force Hc of 10 Oe or more. The films containing 15 atomic % or more of Fe, which were prepared by means of sputtering under an argon gas atmosphere having a nitrogen gas added thereto such that the nitrogen gas partial pressure fell within the range of between about $7.2 \times 10^{-4}$ Torr and $9 \times 10^{-4}$ Torr exhibited a coercive force Hc of 3 Oe or less, which was lower than that of the films prepared by means of sputtering under a pure argon gas atmosphere. On the other hand, the films containing less than 15 atomic % of Fe, which were prepared in the presence of a nitrogen gas, exhibited a relatively high coercive force Hc of 10 Oe or more. In conclusion, FIG. 2 shows that a film containing at least 15 atomic % of Fe, which is prepared means of sputtering under an argon gas atmosphere having a nitrogen gas added thereto, exhibits a relatively low coercive force Hc.

FIG. 3 shows the relationship between the magnetostriction λs and the nitrogen gas partial pressure with respect to films containing at least 15 atomic % of Fe, which exhibited a low Hc in the experiments performed previously. The value of λs was determined by measuring a change in the anisotropic magnetic field caused by a unidirectional stress which was imparted to the film by bending the substrate. As apparent from FIG. 3, the films containing 15 to 24 atomic % of Fe which were prepared under a nitrogen gas partial pressure within the range of between $2.5 \times 10^{-4}$ Torr to $5.2 \times 10^{-4}$ Torr exhibited such a small value of λs as about $5 \times 10^{-6}$. Particularly, where the nitrogen gas partial pressure was set at $3.8 \times 10^{-4}$ Torr, the value of λs was as small as about $3 \times 10^{-6}$ or less. Incidentally, the film exhibited such a high saturation magnetic flux density Bs as 19 kG. A film containing 31 atomic % of Fe which was prepared under the nitrogen gas partial pressure of about $3.8 \times 10^{-5}$ Torr also exhibited the smallest value of λs. However, the value was relatively large, i.e., $1 \times 10^{-5}$ or more. In conclusion, FIG. 3 shows that a magnetic film containing 15 to 24 atomic % of Fe, which is prepared by means of sputtering under an argon gas atmosphere having a nitrogen gas added thereto, exhibits satisfactory soft magnetic properties, i.e., a high saturation magnetic flux density Bs as high 19 kG, a low coercive force Hc and a low magnetostriction λs. It should be noted that the partial pressure of a nitrogen gas added to an argon gas should preferably fall within a range of between $2.5 \times 10^{-4}$ Torr and $5.2 \times 10^{-4}$ Torr. More desirably, the nitrogen gas partial pressure should be set at about $3.8 \times 10^{-4}$ Torr.

Figure 7:
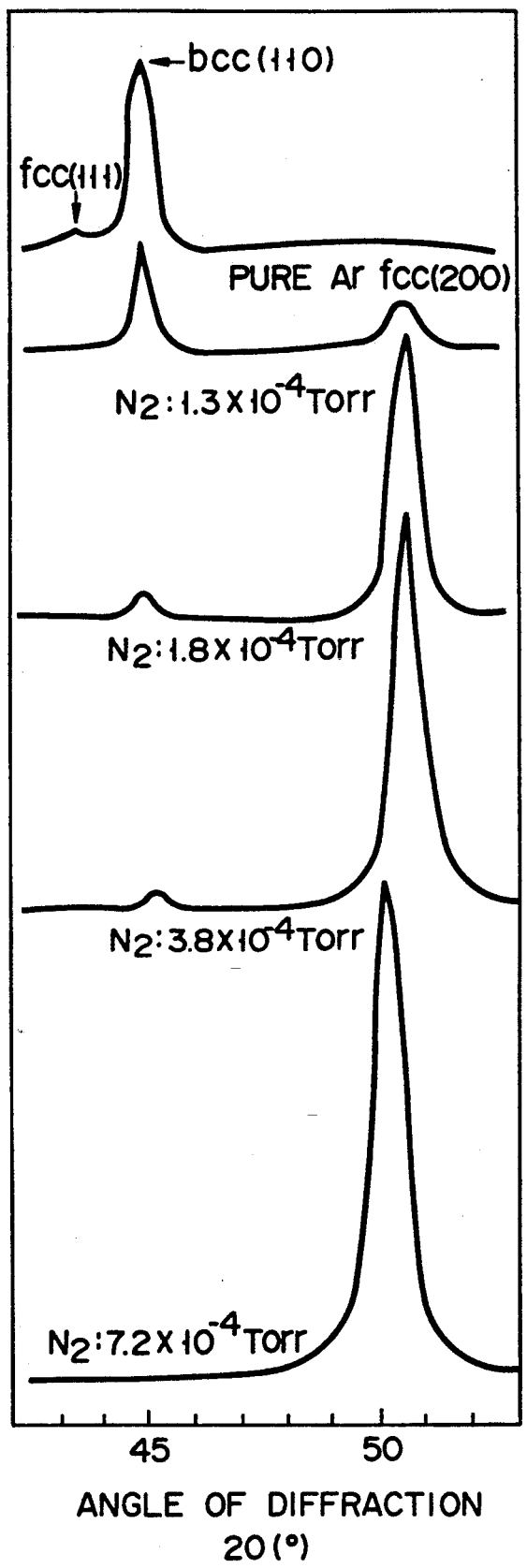
FIG. 7 is a graph showing how the X-ray diffraction curve depends on the nitrogen gas partial pressure in a film containing 18 atomic % of Fe.

The magnetostriction $\lambda s$ of a Fe-series magnetic film is known to be dependent on the crystal orientation of the film. In order to clarify why a film containing 15 to 24 atomic % of Fe exhibits a low magnetostriction $\lambda s$, the crystal orientation of the film was examined. The results are shown in FIGS. 4, 5 and 7. In this experiment, the crystal structure was examined by an X-ray diffraction apparatus using a Cuk$\alpha$ ray.

FIG. 4 shows an example of an X-ray diffraction curve ($2\theta = 40$ to $100°$) for a magnetic film prepared by means of sputtering under a pure argon gas atmosphere. Small peaks caused by, for example, noise are excluded from the X-ray diffraction curve. As seen from FIG. 4, a film containing 9.5 atomic % of Fe did not show a peak of the bcc phase, but exhibited a peak of high intensity assigned to the fcc phase (111) plane. This film is considered to be the one wherein the fcc phase in which the <111> axis is oriented in a direction perpendicular to the film surface is preferentially formed, i.e., the fcc phase <111> axis oriented film. The peak intensity of the fcc phase (111) was lowered with increase in the Fe concentration toward 18 atomic % and further toward 31 atomic %. On the other hand, the peak intensity of bcc phase (110) plane, which newly appeared, was found to have been promoted with increase in the Fe concentration in the film. A film containing 31 atomic % of Fe did not exhibit a peak of fcc (111) phase, but exhibited a peak of a high intensity assigned to bcc (110) phase. Each of the films containing 18 and 31 atomic % of Fe is considered to be the ones wherein bcc phase in which the <110> axis is oriented in a direction perpendicular to the film surface is preferentially formed, i.e., the bcc phase <110> axis oriented film. In conclusion, FIG. 4 shows that a fcc phase <111> axis oriented film and/or a bcc phase <110> axis oriented film are obtained in the case where the sputtering is carried out under a pure argon gas atmosphere.

FIG. 5 shows an X-ray diffraction curve ($2\theta = 40$ to $100°$), which corresponds to magnetic films prepared by means of sputtering under an Ar-N$_2$ atmosphere having a nitrogen gas partial pressure of $3.8 \times 10^{-4}$ Torr, said atmosphere being considered to achieve a low magnetostriction $\lambda s$. As seen from FIG. 5, films containing 24 atomic % or less of Fe mainly exhibited a peak of a high intensity denoting the fcc phase (200) plane. In this case, the ratio of the peak intensity of the fcc phase (200) plane to the peak intensity of the other phase plane was found to be 7 : 1 or more. The film is considered to the fcc phase <100> axis oriented film. On the other hand, the film containing 31 atomic % of Fe exhibited a peak for the fcc phase (200) plane and, at the same time, a relatively high peak for the bcc phase (110) plane like a film prepared by means of sputtering under a pure argon gas atmosphere.

Figure 6:
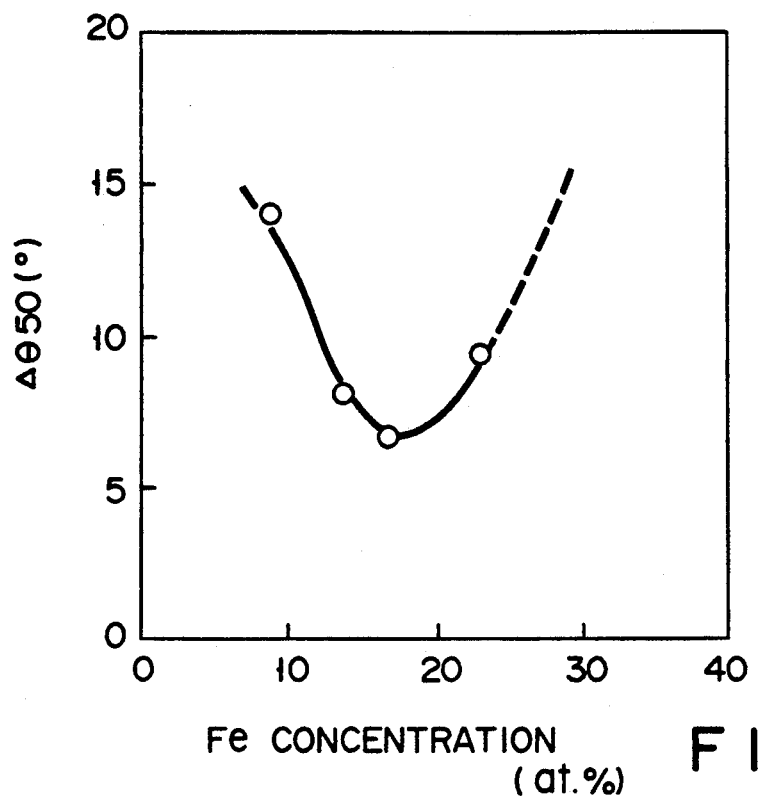
FIG. 6 is a graph showing how the rocking curve half width relative to the phase (200) plane peak depends o the Fe concentration.

The relationship described above between the magnetostriction $\lambda s$ and the Fe concentration indicates that the bcc phase <110> axis oriented film exhibits a high large value of $\lambda s$, with the fcc phase <100> axis oriented film exhibiting a small value of $\lambda s$. FIG. 6 show the relationship between the half value width of the rocking curve with respect to the peak of the fcc phase (200) and the Fe concentration. It is seen that a film containing 18 atomic % of Fe exhibits the smallest half value width (about 6°). In other words, a film containing 18 atomic % of Fe is most satisfactory in terms of the fcc phase <100> axis orientation.

The effect given by the nitrogen gas partial pressure to a film containing 18 atomic % of Fe was examined in detail by using an X-ray diffractory apparatus. FIG. 7 shows the results. As seen from the drawing, the intensity of the peak of the fcc phase (200) is increased with increase in the nitrogen gas partial pressure until the nitrogen gas partial pressure is increased to reach $3.8 \times 10^{-4}$ Torr. In other words, the degree of <100> axis orientation is increased with increase in the nitrogen gas partial pressure. It should be noted that, where the ratio of the peak intensity for the fcc phase (200) plane to the peak intensity for the bcc phase (110) plane is increased to reach 7 : 1 or more, the value of $\lambda s$ is lowered to $2 \times 10^{-6}$. Further, where the nitrogen gas partial pressure was increased to exceed $2 \times 10^{-4}$ Torr, no change was recognized in the peak intensity for the fcc phase (100), and the fcc phase <100> axis orientation was maintained. In this case, the peak for the bcc phase (110) plane was not recognized. Where the nitrogen gas partial pressure was increased to reach $5.2 \times 10^{-4}$ Torr, the value of $\lambda s$ was lowered and the degree of the fcc phase <100> axis orientation was improved. Further, where the nitrogen gas partial pressure exceeded $5.2 \times 10^{-4}$ Torr, the magnetostriction $\lambda s$ was increased. What should be noted is that an fcc phase <100> axis oriented film fails to exhibit a low value of $\lambda s$ in some cases.

Figure 8:
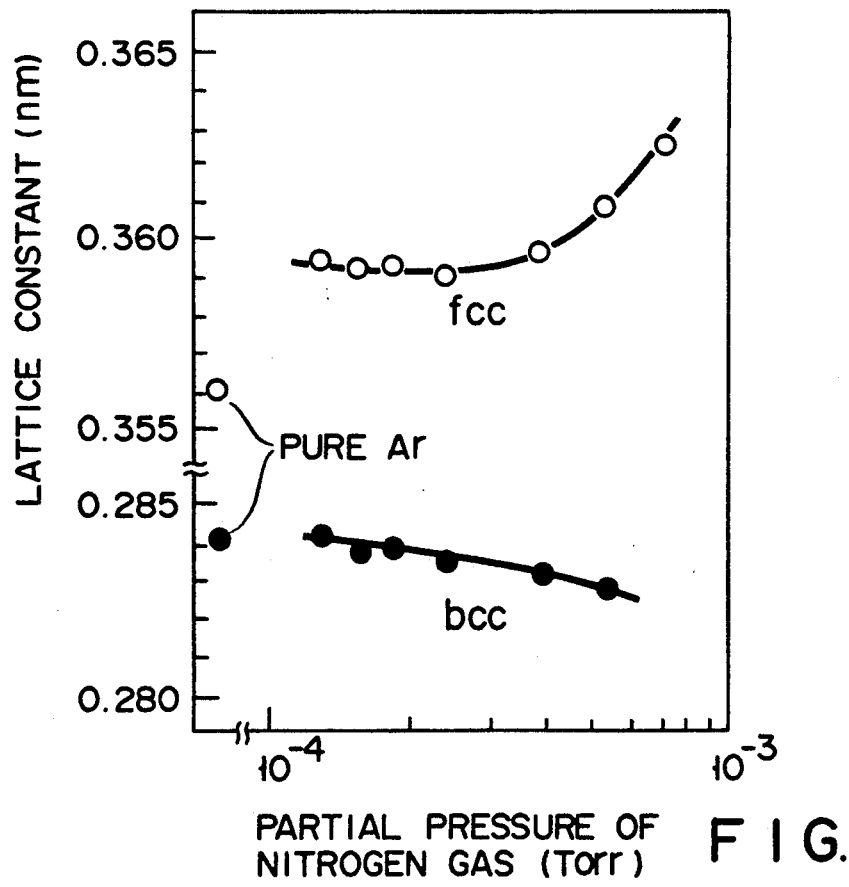
FIG. 8 is a graph showing how the lattice constant depends on the nitrogen gas partial pressure in a film containing 18 atomic % of Fe.
Figure 9:
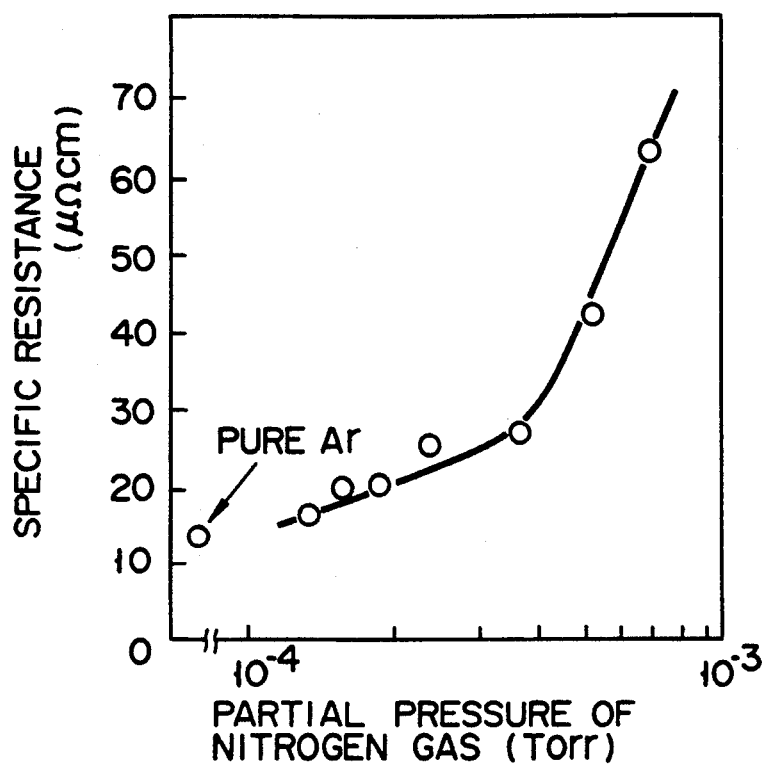
FIG. 9 is a graph showing how the specific resistance depends on the nitrogen gas partial pressure in a film containing 18 atomic % of Fe.

In order to clarify the reasons for the increase in the value of $\lambda s$, it was examined how the lattice constant and the specific resistance of the crystals constituting a magnetic film are dependent on the nitrogen gas partial pressure. FIGS. 8 and 9 show the results.

As apparent from FIG. 8, an increase in the nitrogen gas partial pressure leads to a slight reduction in the lattice constant of the bcc phase. On the other hand, the lattice constant of the fcc phase was found to remain substantially constant within a range of between 0.359 and 0.360 even if the nitrogen gas partial pressure was increased to about $3.8 \times 10^{-4}$ Torr. However, the lattice constant was increased to exceed 0.361 when the nitrogen gas partial pressure was increased to exceed $3.8 \times 10^{-4}$ Torr.

On the other hand, FIG. 9 shows that the specific resistance was slightly increased when the nitrogen gas partial pressure was increased to $3.8 \times 10^{-4}$ Torr. However, the value of the specific resistance was 30 $\mu\Omega\cdot$cm, which was substantially equal to the value exhibited by a film prepared under a pure argon gas atmosphere. The specific resistance was greatly increased to exceed 40 $\mu\Omega\cdot$cm when the nitrogen gas partial pressure was increased to exceed $3.8 \times 10^{-4}$ Torr.

As apparent from the results of the experiments described above, which were intended to clarify how the nitrogen gas partial pressure would affect the magnetostriction $\lambda s$, the lattice constant and the specific resistance, it is desirable to set the nitrogen gas partial pressure to fall within the range of between $5 \times 10^{-4}$ Torr and $3.8 \times 10^{-4}$ Torr.

Figure 10:
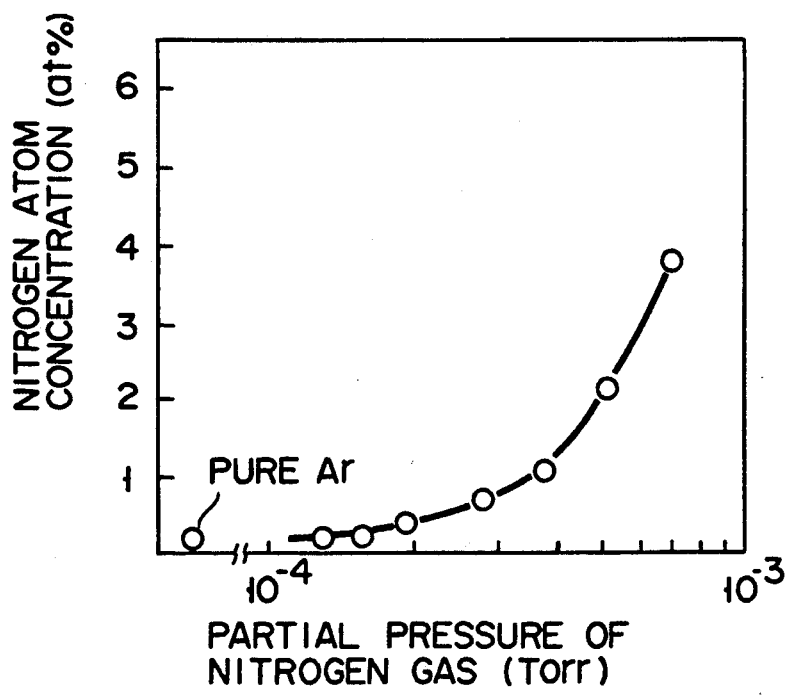
FIG. 10 is a graph showing the relationship between the nitrogen atom content and the nitrogen gas partial pressure in a film containing 18 atomic % of Fe.

The experimental results shown in FIGS. 8 and 9 suggest that the increase in the lattice constant and in the specific resistance might have been caused by the incorporation of excessive nitrogen atoms into the lattice of the crystal structure. Thus, the nitrogen atom content of the magnetic film was examined in an attempt to determine the suitable nitrogen atom content of the film. FIG. 10 shows the results. The nitrogen atom content of the magnetic film was measured by means of a steam distillation-Nessler's absorption photometric analysis. FIG. 10 shows that the magnetic film contains 0.5 to 2 atomic % of nitrogen in the case where the nitrogen gas partial pressure falls within the range of between $2.5 \times 10^{-4}$ Torr and $3.8 \times 10^{-4}$ Torr. In conclusion, a magnetic film containing 0.5 to 2 atomic % of nitrogen, i.e., a magnetic film prepared by means of sputtering under a nitrogen gas partial pressure of $2.5 \times 10^{-4}$ Torr to $3.8 \times 10^{-4}$ Torr, exhibits a small value of λs.

In the embodiments described above, nitrogen atoms are incorporated into the crystal structure forming a magnetic film. However incorporating atoms need not be restricted to nitrogen in the present invention. Any kind of incorporating atoms can be used in the present invention as far as the atomic radius is nearly equal to that of nitrogen atom. For example, oxygen atoms and neon atoms can be used in place of nitrogen atoms.

As described above in detail, it is advisable to manufacture a Co-rich Fe magnetic film containing 15 to 24 atomic % of Fe with Co being substantially the balance by means of sputtering under a mixed gas atmosphere consisting of an argon gas and a nitrogen gas, the nitrogen gas partial pressure falling within the range of between $2.5 \times 10^{-4}$ Torr and $3.8 \times 10^{-4}$ Torr In the magnetic film thus manufactured according to the invention, fcc phase in which the <100> axis is oriented in a direction perpendicular to the film surface is preferentially formed, so as to form an oriented structure. In other word, the Co-rich Fe alloy crystal structure constituting the magnetic film of the invention has such fcc phase in the largest amount among other crystal phases. It is important to note that a magnetic head having a high saturation magnetic flux density Bs, a low coercive force Hc and a low magnetostriction λs can be obtained by using the magnetic film noted above.

Figure 11:
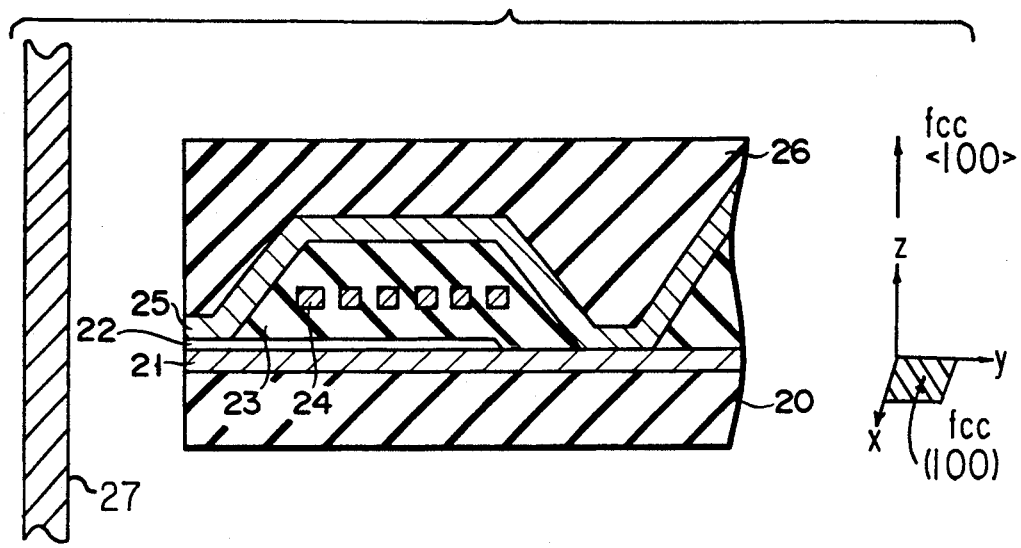
FIGS. 11 and 12 are cross sectional views each showing the gist portion of a magnetic head of the present invention.

A magnetic head of the present invention is manufactured as follows. Specifically, FIG. 11 is a cross sectional view showing a magnetic head for a hard disc of a longitudinal recording type. As seen from the drawing, the magnetic head comprises a substrate 20. In general, the substrate 20 is formed of, for example, an $A\lambda_2O$—$TiO_2$ and the like. A first Co-rich Fe magnetic film 21 is formed on the substrate 20 by means of sputtering according to the present invention. The first Co-rich Fe magnetic film 21 contains 18 atomic % of Fe. The sputtering was carried out by, as described above, using the sputtering apparatus as shown in FIG. 1 under an argon gas atmosphere having a nitrogen gas partial pressure of $3.8 \times 10^{-4}$ Torr. An insulating layer 23 is selectively formed on the surface of the magnetic film 21 with a gap layer 22 interposed therebetween. A plurality of coils 24 for forming a magnetic field are buried apart from each other in the insulating layer 23. Incidentally, the insulating layer 23 is formed of silicon dioxide, which is the ordinary insulating material. Also, the insulating layer 23 is formed by the ordinary sputtering method. Then, a second Co-rich Fe magnetic film 25 is formed on the entire surface so as to cover the insulating layer 23 as well as the exposed surfaces of the first magnetic film 21 and the gap layer 22, thereby to obtain a desired magnetic head of the present invention. The second magnetic film 25 is formed as in the formation of the first magnetic film 21. Further, a protective film 26 is formed on the second magnetic film 25 so as to protect the magnetic film. The magnetic medium 27, a hard disk platter for example, is perpendicular to the first magnetic film 21.

Incidentally, the protective film 26 may be formed of, for example, $A\lambda_2O_3$ and formed by the known deposition method. The magnetic film included in the magnetic head thus manufactured exhibits a high saturation magnetic flux density, compared with the conventional magnetic film such as a Ni—Fe film or a Co-series amorphous film. As a result, the magnetic head of the present invention permits a sufficient recording with respect to even a magnetic recording medium having a high coercive force, making it possible to achieve the information recording at a high density.

Figure 12:
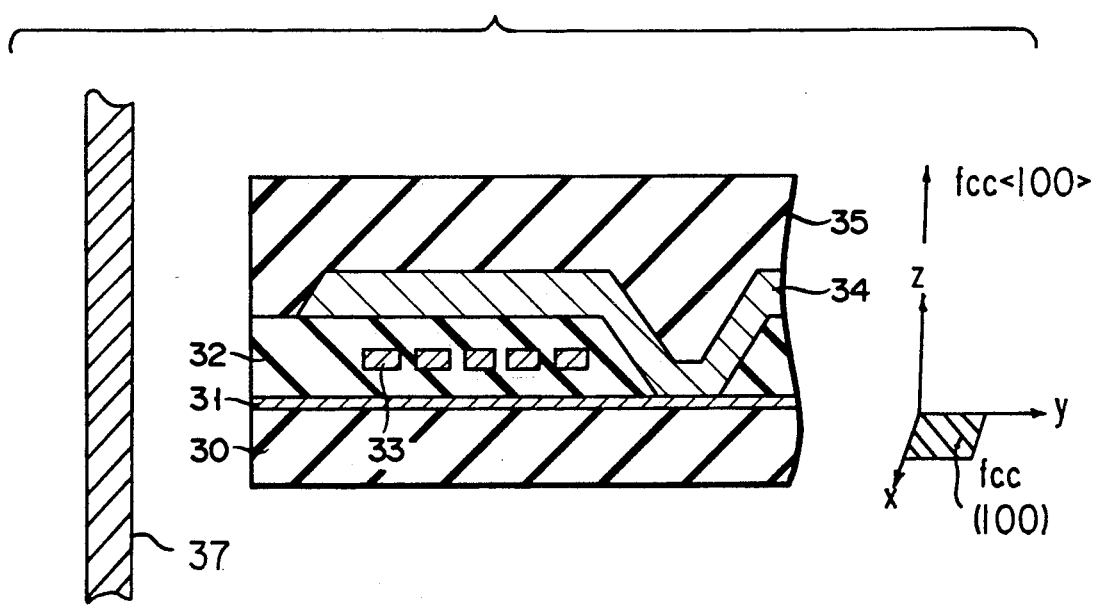

FIG. 12 is a cross sectional view showing a magnetic head of a perpendicular recording type. As seen from the drawing, the magnetic head comprises a substrate 30 formed of a $A\lambda O_3$—$TiO_2$ material. A first Co-rich Fe magnetic film 31 is formed o the substrate 20 by means of sputtering according to the present invention. The first Co-rich Fe magnetic film 31 contains 18 atomic % of Fe. The sputtering was carried out under an argon gas atmosphere having a nitrogen gas partial pressure of $3.8 \times 10^{-4}$ Torr. An insulating layer 32 is selectively formed on the surface of the magnetic film 31. A plurality of coils 33 are buried apart from each other in the insulating layer 32. Incidentally, the insulating layer 32 may be formed of silicon dioxide, which is the ordinary insulating material. Also, the insulating layer 32 may be formed by the ordinary sputtering method. Then, a second Co-rich Fe magnetic film 34 is formed on the entire surface so as to cover the insulating layer 32 as well as the exposed surface of the first magnetic film 31, thereby to obtain a desired magnetic head of the present invention. It should be noted that the second magnetic film 34, which is formed as in the formation of the first magnetic film 21, serves to form a return path magnetic body. Further, a protective film 35 is formed on the second magnetic film 34 so as to protect the magnetic film. The magnetic medium 37, a hard disk platter for example, is perpendicular to the first magnetic film 31. Incidentally, the protective film 35 may be formed of, for example, $A\lambda_2O_3$ and formed by the known deposition method.

The magnetic film included in the magnetic head thus manufactured exhibits a high saturation magnetic flux density, compared with the conventional magnetic film such as a Co-series amorphous film. As a result, the magnetic head of the present invention makes it possible to diminish the thickness of the first magnetic film and, thus, to achieve a perpendicular information recording at a high density.

Incidentally, a magnetic head for a longitudinal information recording was also prepared as above, except that the substrate used was formed of magnesium oxide and that the first Co-rich Fe alloy film was formed on the (100) plane of the substrate under a pure argon gas atmosphere. The magnetic head thus prepared exhibited excellent magnetic properties, i.e., Bs=19 kG, Hc=3 Oe, λs=$1 \times 10^{-6}$, like the magnetic heads prepared previously. Also, the magnetic head exhibited a crystal structure that the fcc phase <100> axis were oriented in a direction perpendicular to the film surface (a peak was recognized in only the fcc phase (200) plane in the X-ray diffraction curve). The results of this experiment indicate that a magnetic head having a high saturation magnetic flux density Bs, a low coercive force Hc and a low magnetostriction λs can be obtained as far as the magnetic head includes a magnetic film of the crystal structure that the fcc phase <100> axis are oriented in a direction perpendicular to the film surface regardless of the method of forming the magnetic film. Note that the fcc phase (100) plane, corresponding to the fcc phase <100> axis, extends perpendicularly outward form the plane of the paper as illustrated in FIGS. 11 and 12.

In the embodiments described above, a nitrogen gas, i.e., a incorporating gas, is mixed with the base gas of argon. However, it is possible to use gases of other elements as the incorporating gas as far as the atomic radius of the element is nearly equal to that of nitrogen atom. For example, it is possible to use an oxygen gas or a neon gas in place of the nitrogen gas. Further, other gases such as a xenon gas or a krypton gas can be used as a base gas in place of the argon gas. A preferred combination of the base gas and the incorporating gas is a combination of an argon gas and a nitrogen gas.

As described above in detail, the present invention provides a magnetic head capable of information recording at a high density. What is important is that the magnetic head of the present invention comprises a ferromagnetic film exhibiting a high saturation magnetic flux density, a low coercive force and a low magnetostriction, making it possible to enable the magnetic head to produce the prominent effects described above.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A magnetic head, comprising:
   a substrate;
   a first magnetic film formed on the substrate and containing a polycrystalline Co-rich Fe alloy, which is composed of mostly a face-centered cubic phase having the $<100>$ axis oriented in a direction perpendicular to a surface of the first magnetic film and is composed of partially a body-centered cubic phase;
   an insulating film formed on the first magnetic film;
   coils buried in the first insulating film for forming a magnetic field; and
   a second magnetic film formed on the insulating film.

2. The magnetic head according to claim 1, wherein the polycrystalline Co-rich Fe alloy contains incorporating atoms selected from the group consisting of nitrogen atoms, oxygen atoms and neon atoms.

3. The magnetic head according to claim 2, wherein the incorporating atoms are nitrogen atoms.

4. The magnetic head according to claim 2, wherein the insulating film is formed on the magnetic film with a gap layer partly interposed therebetween.

5. The magnetic head according to claim 2, wherein the polycrystalline Co-rich Fe alloy film is formed on an underlying layer comprising magnesium oxide.

6. The magnetic head according to claim 1, wherein the polycrystalline Co-rich Fe alloy contains 0.5 to 2 atomic % of nitrogen atoms.

7. The magnetic head according to claim 1, wherein the polycrystalline Co-rich Fe alloy contains 15 to 24 atomic % of Fe.

8. The magnetic head according to claim 1, wherein the body-centered cubic phase has a $<110>$ axis.

9. The magnetic head according to claim 1, wherein:
   the second magnetic film also contains a polycrystalline Co-rich Fe alloy which is composed of mostly a face-centered cubic phase having he $<100>$ axis oriented in a direction perpendicular to a surface of the second magnetic film and is partially composed of a body-centered cubic phase; and
   a protective film is formed on the second magnetic film.

10. The magnetic head according to claim 1, wherein:
    the first magnetic film surface is perpendicular to a surface of a magnetic medium when the head is being utilized with the magnetic medium.

11. The magnetic head according to claim 1, further comprising:
    a magnetic gap between the first and second magnetic films.

12. A magnetic head, comprising:
    a substrate;
    a first magnetic film formed on the substrate and containing a polycrystalline Co-rich Fe alloy, which is composed of mostly a face-centered cubic phase having the $<100>$ axis oriented in a direction perpendicular to a surface of the first magnetic film and is composed of partially a body-centered cubic phase;
    an insulating film formed on the first magnetic film;
    coils buried in the first insulating film for forming a magnetic field; and
    a second magnetic film formed on the insulating film, wherein the polycrystalline Co-rich Fe alloy has an X-ray diffraction peak intensity of a face-centered cubic phase (200) plane at least 7 times as high as an X-ray diffraction peak intensity of a body-centered cubic phase (110) plane in a plane parallel with the surface of the first magnetic film.

* * * * *